United States Patent [19]
Fisher et al.

[11] Patent Number: 5,367,686
[45] Date of Patent: Nov. 22, 1994

[54] METHOD FOR AUTOMATED COMPLEX MULTILEVEL SOFTWARD INSTALLATION IN A DATA PROCESSING SYSTEM

[75] Inventors: Arvin J. Fisher, Rochester, Minn.; Alan Hlava, Longmont, Colo.; Paul D. Koeller, Rochester, Minn.; Mary C. Manges, Rochester, Minn.; Michael K. Russell, Rochester, Minn.; Robert H. Satin, Rochester, Minn.; Gordon G. Stewart, Byron, Minn.; Patricia A. Timms, Rochester, Minn.

[73] Assignee: International Business Machines Corporation, Armonk, N.Y.

[21] Appl. No.: 46,510

[22] Filed: Apr. 12, 1993

Related U.S. Application Data

[63] Continuation of Ser. No. 569,891, Aug. 29, 1990, abandoned.

[51] Int. Cl.$^5$ .............................................. G06F 9/44
[52] U.S. Cl. .................................... 395/700; 395/650; 364/280; 364/281.3; 364/DIG. 1
[58] Field of Search ................ 395/650, 700; 364/280, 364/281.3

[56] References Cited

U.S. PATENT DOCUMENTS

| | | | |
|---|---|---|---|
| 4,590,557 | 5/1986 | Lillie | 364/200 |
| 4,626,986 | 12/1986 | Mori | 364/200 |
| 4,663,707 | 5/1987 | Dawson | 364/200 |
| 4,720,812 | 1/1988 | Kao et al. | 364/900 |
| 4,833,594 | 5/1989 | Familetti et al. | 364/200 |
| 4,979,106 | 12/1990 | Schneider | 364/200 |

FOREIGN PATENT DOCUMENTS

| | | |
|---|---|---|
| 0100140 | of 0000 | United Kingdom . |
| 0116694 | of 0000 | United Kingdom . |
| 0358304 | of 0000 | United Kingdom . |
| 0398647 | of 0000 | United Kingdom . |

OTHER PUBLICATIONS

"Configuration Procedure for Licensed Program Product", vol. 28, No. 4, Sep. 1985, p. 1433.
"Configuration File Comprising Configuration Commands and Data", vol. 28, No. 4, Sep. 1985, p. 1441.
"Device/Profile Installation Procedure with Validation", vol. 28, No. 4, Sep. 1985, p. 1487.
"Automated System Initialization", by S. M. Kaufmann, vol. 15, No. 10, Mar. 1973, pp. 3215-3216.
"The Connection", by Kevin Phillips, Jan. 1991, p. 82.
Vincent Alfieri, The Best Book of WordPerfect 5.1, 1988, pp. xxxvi-xlii.
Microsoft Corporation, Microsoft MS-DOS User's Guide, 1986, pp. 17-23.
Robert Jourdain, Programmer's Problem Solver for the IBM PC, XT, & AT, 1986, pp. 1-16 and 252-267.
J. A. Aiken, Jr. "Configuration-Sensitive Program Load", IBM Technical Disclosure, vol. 22, No. 10, Mar. 1980, pp. 4351-4352.

*Primary Examiner*—Gareth D. Shaw
*Assistant Examiner*—Dennis M. Butler
*Attorney, Agent, or Firm*—Steven W. Roth; Andrew J. Dillon

[57] ABSTRACT

The method of the present invention presents a plurality of option panels to a user, each option panel requiring at least one user input which specifies a system option for a selected data processing system. Thereafter, an installation profile is created utilizing these specified system options, including at least a description of the operating system to be utilized and a description of the data processing system hardware configuration. In one embodiment of the present invention this installation profile is then stored in conjunction with a complex multilevel software application on a portable storage media, such as a tape reel. Thereafter, the installation of the complex multilevel software application may be automatically accomplished by reference to the installation profile which contains those values which represent preset installation options. An operating system is installed utilizing the values set forth in the installation profile and the Initial Program Load (IPL) of the operating system is also accomplished utilizing the preset installation options contained within the installation profile.

13 Claims, 4 Drawing Sheets

METHOD FOR AUTOMATED COMPLEX MULTILEVEL SOFTWARD INSTALLATION IN A DATA PROCESSING SYSTEM

This application is a continuation of application Ser. No. 07/569,891, filed Aug. 29, 1990, now abandoned.

BACKGROUND OF THE INVENTION

1. Technical Field

The present invention relates in general to the field of data processing systems and in particular to methods for installing complex software applications within a data processing system. Still more particularly the present invention relates to methods for automating the installation of complex software applications within a data processing system.

2. Description of the Related Art

State-of-the-art data processing systems are becoming increasingly complex. Concomitant with the increasing complexity of the hardware aspects of data processing systems is the increasing complexity of the computer software applications required for such systems. Generally a so-called "multilevel" software application is utilized in such data processing systems, consisting of microcode, an operating system and one or more software applications. The task of installing or upgrading such a complex computer software application on a modern data processing system is often quite difficult to accomplish. Generally, in complex data processing systems the software applications are not installed by a system operator but rather by an installation expert who is often trained by the source of the software application. Typically, these installation experts are employed by a central site which supports multiple remote sites or by the originator of the software application. Further, as the number of complex data processing systems increase across the country it should be apparent that it has become increasingly costly to require the presence of an installation expert to install or upgrade software at the location of each system.

The problem of installing a high level software application has been addressed by the utilization of batch files, such as AUTOEXEC.BAT and other similar files on personal computers. These batch files are typically utilized to initiate the installation of a simple software application which is designed to be run in a fully operational personal computer environment where the microcode and operating system is already installed. However, complex multilevel software applications which are designed to run on personal computers, mainframes, or general purpose mid-range systems, such as the AS/400 computer system marketed by International Business Machines Corporation, are simply too complex to be initiated in this manner. Another problem which exists in this environment is caused by the fact that these computer systems may be configured in many different arrangements, each of which may require modifications to the multilevel software application.

The manner in which complex multilevel software applications are installed or upgraded in such data processing systems in the prior art requires the services of an installation expert. The installation expert must interact on a substantially constant basis with a setup program in order to ensure that the installation of the software is accurately accomplished. At various points within the installation procedure, wherein multiple options reflecting system configurations are possible, the installation expert is typically presented with multiple option panels or displays during the installation process and must characterize the environment and configuration of the data processing system in a manner which will permit the software application to function properly.

It should therefore be apparent that a need exists for an improved method for installing and updating complex multilevel software applications in a data processing which does not require the interaction of an installation expert at each location wherein the software application is to be installed.

SUMMARY OF THE INVENTION

It is therefore one object of the present invention to provide an improved data processing system.

It is another object of the present invention to provide an improved method for installing complex multilevel software applications within a data processing system.

It is yet another object of the present invention to provide a method which permits the automated installation of complex multilevel software applications within a data processing system.

The foregoing objects are achieved as is now described. The method of the present invention presents a plurality of option panels to a user, each option panel requiring at least one user input which specifies a system option for a selected data processing system. Thereafter, an installation profile is created utilizing these specified system options, including at least a description of the operating system to be utilized and a description of the data processing system hardware configuration. In one embodiment of the present invention this installation profile is then stored in conjunction with a complex multilevel software application on a portable storage media, such as a tape reel. Thereafter, the installation of the complex multilevel software application may be automatically accomplished by reference to the installation profile which contains those values which represent preset installation options. An operating system is installed utilizing the values set forth in the installation profile and the Initial Program Load (IPL) of the operating system is also accomplished utilizing the preset installation options contained within the installation profile. Thereafter, in accordance with one embodiment of the present invention, an installation user profile is created as part of the installation process and this profile is utilized to automatically sign-on to the data processing system for utilization in the installation of additional software applications, without the necessity of user intervention.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
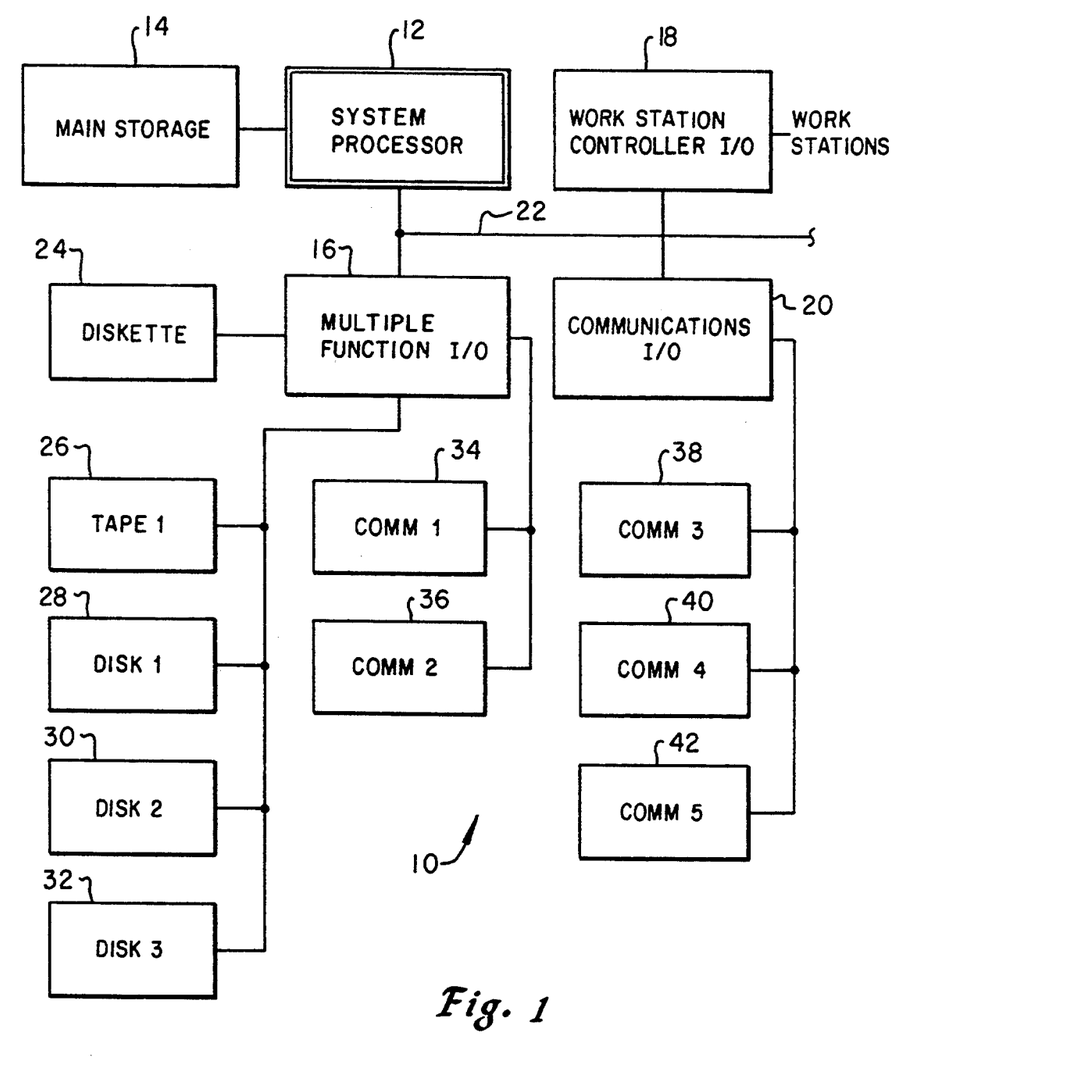
FIG. 1 is a high level block diagram depicting the system data flow of a data processing system which may be utilized with the method of the present invention.

With reference now to the Figures and in particular with reference to FIG. 1, there is depicted a high level block diagram illustrating the system data flow of a data processing system 10 which may be utilized to implement the method of the present invention. Data processing system 10 is preferably implemented utilizing a general purpose midrange computer system, such as the AS/400 system manufactured by International Business Machines Corporation, although any other type of computer system, such as a personal computer or a mainframe computer, could also be used.

As is illustrated, data processing system 10 includes a system processor 12 which preferably is implemented utilizing very large scale integration (VLSI) logic and which is utilized to communicate with independently functioning input/output processors over a high speed bus 22. Additionally, system processor 12 is also utilized for access to main storage 14. In a depicted embodiment in the present invention system processor 12 utilizes virtual-address translation hardware which converts virtual addresses to main storage addresses. Address translation tables in main storage and a translation lookaside buffer in hardware are utilized to provide high speed assistance for mapping from virtual to real main storage addresses. System processor 12 preferably utilizes a 32 bit path and 48 bit addressing, which can provide direct access to 281 trillion bytes of storage within main storage 14. Main storage 14 is preferably implemented utilizing state-of-the-art storage technology, such as the one megabyte production storage technology offered by International Business Machines Corporation.

System processor 12 is also coupled to multiple function I/O processor 16, work station controller I/O 18 and communications I/O processor 20 via high speed I/O bus 22. High speed I/O bus 22 is preferably implemented utilizing a 36 bit multiplexed address and data bus (32 data bits and 4 parity bits) along with a control and arbitration line. High speed I/O bus 22 preferably operates asynchronously and utilizes a priority serial/arbitration mechanism. High speed I/O bus 22 can address up to 32 I/O bus units, including system processor 12.

Multiple function I/O processor 16 is preferably implemented utilizing a combination of hardware and microcode to provide a combination of service processor, magnetic media storage device control and communications control in a single one-card I/O processor. The service processor function may be utilized to perform the initial program load (IPL) for data processing system 10 and also provides an interface to the customer control panel for diagnosing the system I/O bus when system processor 12 cannot. The service processor function also preferably includes a time-of-day clock supporting a timed power-on function for the system.

The magnetic media storage device control function within multiple function I/O processor 16 preferably services disk, tape and diskette I/O requests from system processor 12, controls the magnetic media devices, data flow and analyzes errors. In one embodiment of the data processing system depicted a Small Computer System Interface (SCSI) bus provides the interface for disk and tape devices such as tape drive 26 and disk drives 28, 30 and 32. This interface bus is asynchronous and will support a 1.5 megabyte per second data rate. Additionally, an ANSI 3.8 interface allows the attachment of either a 5.25 or 8 inch diskette drive, such as diskette 24.

The communications processor control function within multiple-function I/O processor 16 can also function to handle data and commands to and from communications lines, such as communications port 34 and communications port 36. Microcode within multiple-function I/O processor 16 preferably supports multiple communications protocols such as: asynchronous communications; binary synchronous communications; synchronous data link control; and X.21. Multiple electrical interfaces are also supported such as RS232, X.21; and V.35.

A dedicated communications I/O processor 20 may also be provided and coupled to system processor 12 via high speed I/O bus 22. Communications I/O processor 20 preferably supports additional communication lines, such as communications ports 38, 40 and 42. Finally, work station controller I/O 18 is coupled to system processor 12 via high speed I/O bus 22 and serves primarily to perform data stream and keystroke processing for attached display stations. Additionally, work station I/O controller 18 also provides protocol conversion support and data stream pass-through for ASCII printers and synchronous printers or personal computers.

Upon reference to the foregoing those ordinarily skilled in the art will appreciate that the system data flow described is a typical data flow for a general purpose midrange computer and various different configurations for such computers are wide spread and typical in data processing systems of this type. Thus, it is common for the installation of complex multilevel software applications within such a system to require the services of an installation expert due to the wide range of possible software and hardware configurations which such general purpose systems may support. It is therefore a primary object of the present invention to provide method whereby the installation of complex multilevel software applications on such systems may be highly automated and made substantially more efficient.

Figure 2:
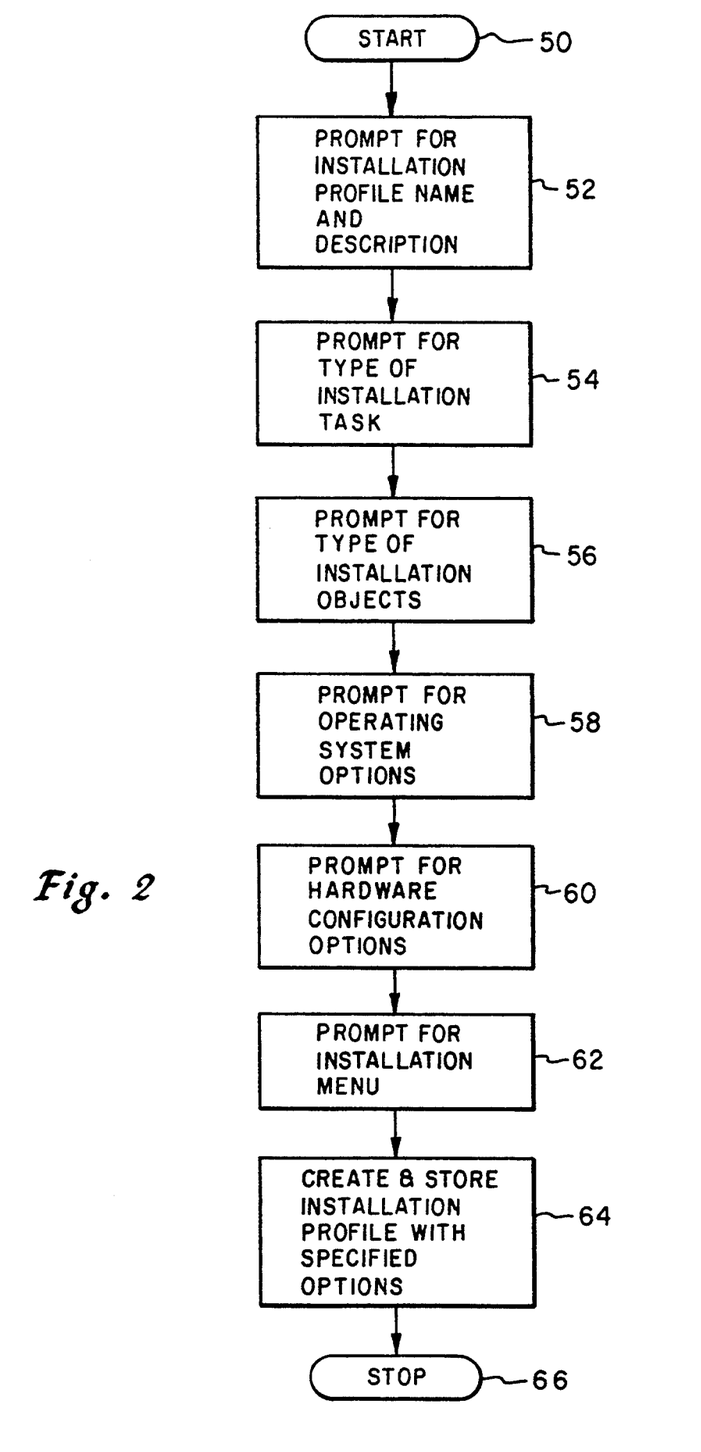
FIG. 2 is a high level flow chart depicting the creation of an installation profile in accordance with the method of the present invention.

Referring now to FIG. 2, there is depicted a high level block diagram which illustrates the creation of an installation profile in accordance with the method of the present invention. This process may take place utilizing any suitable computer or data processing system and each instance of prompting a user may be simply implemented by providing a display screen which includes a panel depicting a prompt and possible suggested response. Of course, an installation profile may be created at a first location and subsequently varied or customized at a second location, such as at the offices of a business partner or software distributor.

As is illustrated, the process begins at block 50 and thereafter passes to block 52 which depicts the prompting of the user for a name and description of the installation profile to be created. Next, block 54 illustrates the prompting of the user for the type of installation task which is to be accomplished. Those skilled in the art will appreciate that various types of installation of software may be accomplished. For example, an initial installation of software onto a brand new data processing system requires one type of installation. Similarly, installation of an upgrade or a new release of a software application requires a different type of installation. Finally, the changing of the language which is utilized by a data processing system while maintaining the applications within that system. Thereafter, the process passes to block 56.

Block 56 illustrates the prompting of the user for the type of installation objects which are to be installed utilizing the installation profile being created. Of course, such installation objects may include programs, language objects or both. Next, as depicted in block 58, the system prompts the user for the entry of those system options which are related to the operating system which will be utilized by the computer upon which the software application will be installed. Those skilled in this art will appreciate that several different operating systems may be utilized in a single type of data processing system.

Block 60 next illustrates the prompting of the user for entries which correspond to those system options related to the hardware configuration of the system. Block 62 depicts the prompting of the user to enter an indication of which software products are to be installed upon the invocation of the installation profile being created. For example, an installation profile may be created which automatically implements the installation of those software products stored on a portable storage media which already exist on the data processing system, in the case of an installation of an upgrade or new release of such software applications. In the event of an initial installation of software applications the installation profile of the present invention may be utilized to install only those software applications which do not previously exist within the data processing system. Similarly, an installation profile may be created which automatically implements the installation of all software applications present on a portable storage media.

Finally, each of the operator inputs which have been solicited by prompting the user by means of a display panel on a computer system are assembled and stored together, creating an installation profile which contains all of the preset installation options necessary to install a complex multilevel software application in a selected data processing system. The process then terminates, as depicted in block 66.

Upon reference to the foregoing those skilled in the art will appreciate that this process permits the creation of an installation profile which contains all of the preset options and characteristics of a selected data processing system which are necessary to automatically install a complex multilevel software application within that data processing system, without requiring an installation expert to travel to the site of the data processing system and interact with the system throughout a long and possibly burdensome installation process. By permitting the creation or customization of an installation profile in an off-line manner, such as the manner depicted, the method of the present invention greatly simplifies the installation process to the point where the only user interaction required at the site of the data processing system is the loading of installation media. Secondly, the method of the present invention provides the distribution authority for a complex software application to create distribution media which contain customized installation profiles which may be utilized to control the installation process for large numbers of data processing systems of selected classes and types.

Figure 3A:
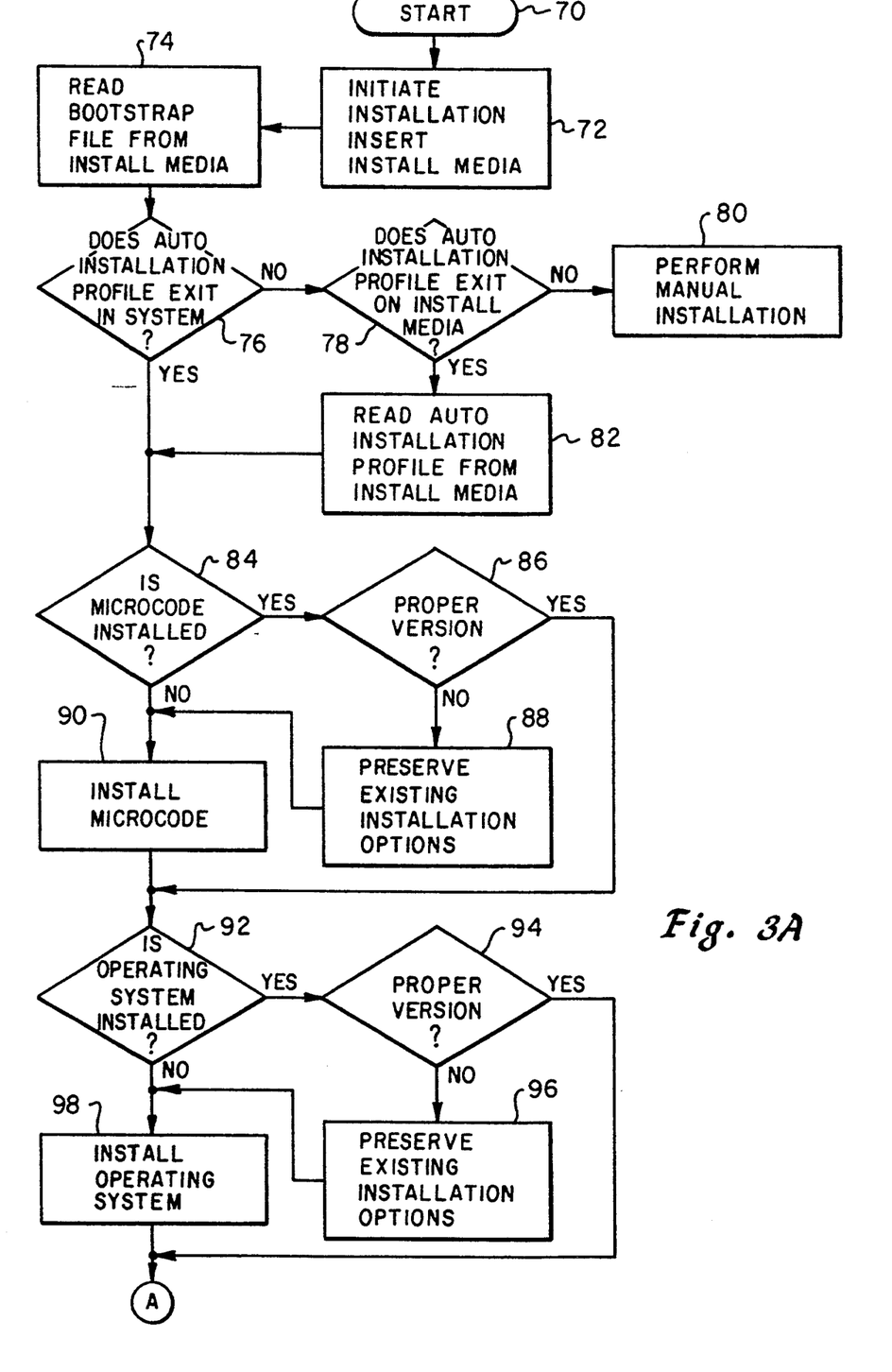
FIGS. 3a and 3b together form a high level flow chart depicting the automatic installation of a complex multilevel software application utilizing the installation profile of FIG. 2.
Figure 3B:
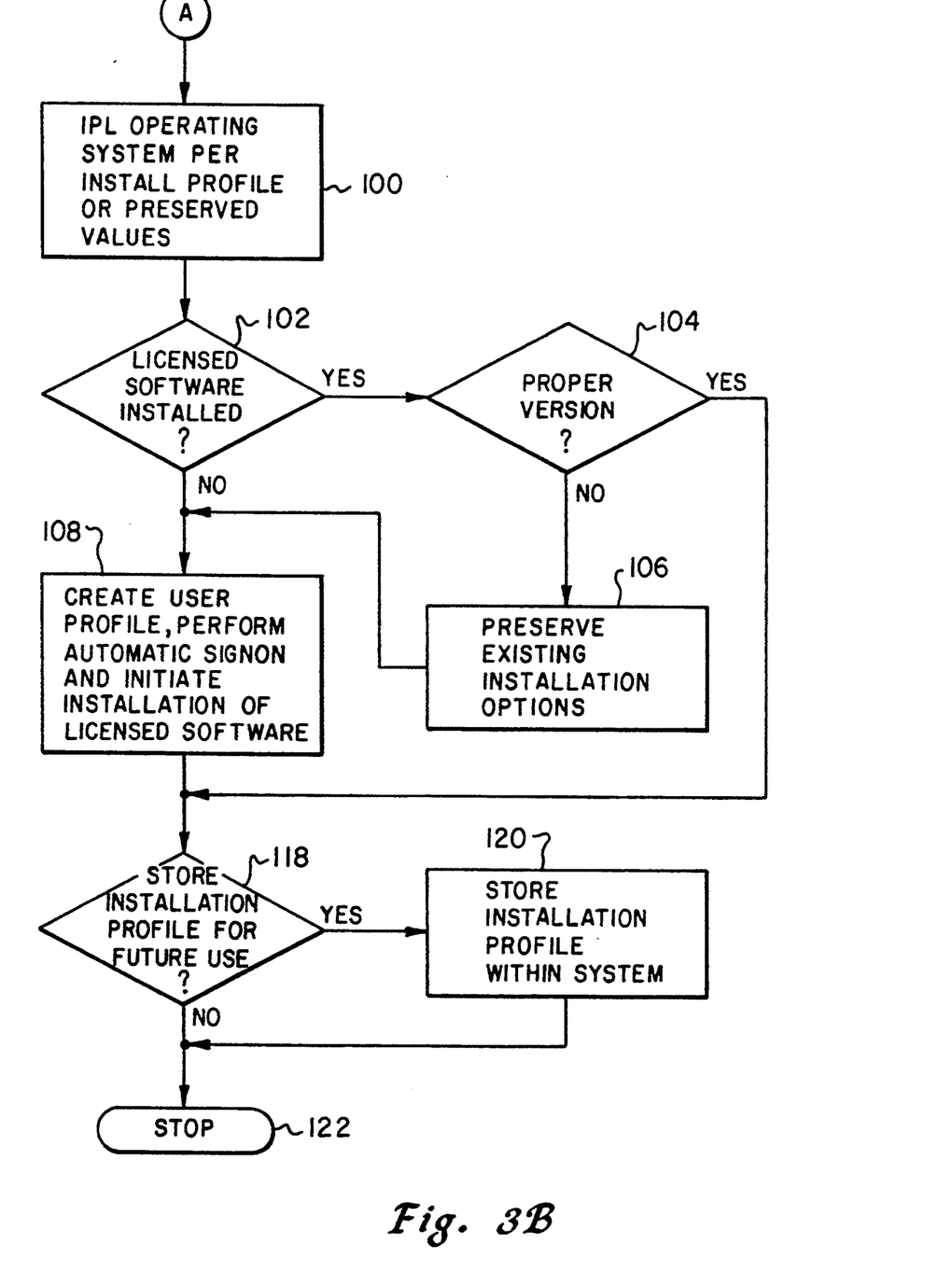

Finally, with reference now to FIGS. 3a and 3b there is depicted a high level flow chart depicting the automatic installation or upgrading of a complex multilevel software application utilizing an installation profile created in accordance with the method depicted within FIG. 2. As is illustrated, the process begins at block 70 and thereafter passes to block 72 which depicts the initiation of the installation process. Next, the process passes to block 74 which illustrates the reading of the initial boot strap file from the portable storage media containing the multilevel software applications to be installed, in a manner well known in the art.

Next, block 76 illustrates a determination of whether or not an installation profile created in accordance with the method of the present invention already exists within the system. If such an installation profile does exist the process passes to block 84 to begin an automatic installation, in a manner which will be explained in greater detail herein. In the event an installation profile does not exist within the system, as determined in block 76, then the process passes to block 78, which illustrates a determination of whether or not an installation profile exists on the installation media provided with the complex multilevel software application to be installed or upgraded. If not, the process passes to block 80 and a manual installation of the software is accomplished.

In the event an installation profile is contained within the portable storage media utilized to store the multilevel software applications to be installed then block 82 illustrates the reading of that installation profile from tile portable storage media. Thereafter, the installation profile which was stored within the system, or read from the portable storage media, is utilized in the installation of a complex multilevel software application in the data processing system.

As set forth in the description of FIG. 2, the installation profile created within FIG. 2 preferably includes inputs from the user who created the installation profile which contain all necessary information relating to the operating system, hardware configuration, device naming conventions, whether or not to perform automatic device configuration, and any special environments which are to be utilized.

The automatic installation of a complex multilevel software application in accordance with the method of the present invention now begins by determining whether or not the necessary microcode has been installed on the data processing system, as illustrated in block 84. In the event the appropriate microcode has been installed, block 86 depicts a determination of whether or not the appropriate version of the microcode is installed. In the event the version of the microcode presently installed on the data processing system is not the appropriate version, and the microcode is to be upgraded utilizing the automatic installation profile of the present invention, block 88 illustrates the preservation of those options relating to microcode which were utilized during the original installation, in lieu of the options specified within the installation profile.

Referring again to block 84, in the event the determination illustrated therein indicates that the microcode has not been installed within the data processing system, or after determining that an earlier version of microcode was installed and preserving the installation options related to the microcode, block 90 illustrates the installation of the microcode which is contained within the installation media. Of course, those skilled in the art will appreciate that in the event the appropriate version of microcode has been installed in the data processing system, either through an earlier attempt at the installation process or due to the fact that an upgrade installation of other software is being accomplished, as determined in blocks 84 and 86, then the process passes directly from block 86 to block 92.

Block 92 illustrates a determination of whether or not an operating system is installed within the data processing system. As above, if an operating system has been installed the process passes to block 94 which illustrates a determination of whether or not the appropriate version of the operating system is in place. In a manner similar to that discussed above with regard to microcode, if the operating system has been installed but an upgraded version is to be installed utilizing the installation profile of the present invention, then block 96 illustrates the preservation of those system options which relate to the operating system. These preserved system options will then be utilized in lieu of the default options contained within the installation profile for the operating system.

Next, block 98 illustrates the installation of the operating system in accordance with the options contained within the installation profile, in the event no operating system is currently installed within the data processing system, or by utilizing the preserved system options which were present within the system in the event all updated version of the operating system is to be installed. As above, in the event the determinations depicted within blocks 92 and 94 indicate that an operating system is installed within the data processing system and the appropriate version is present the process passes directly from block 94 to block 100.

Next, block 100 illustrates the automatic Initial Program Loading (IPL) of the operating system, utilizing the installation profile values which were created as illustrated in FIG. 2, or which were preserved from a previous installation.

At this point, block 102 illustrates a determination of whether or not a licensed software package is already installed within the data processing system. In the event a licensed software package is installed, block 104 depicts a determination of whether or not the version installed is the appropriate version. As above, if licensed software applications are installed but an upgraded version is to be installed utilizing the installation profile of the present invention, block 106 illustrates the preservation of the system options which apply to the installation of those licensed software applications.

In the event a licensed software application has not been installed within the data processing system or has been installed and is being upgraded, block 108 illustrates the creation of an installation user profile which is automatically created during the installation process. This user profile is created with sufficient authority to perform a software installation but without sufficient authority to be utilized as a normal sign-on ID or to initiate other jobs on the system. This installation user profile is created in order to eliminate the need for a user to sign-on to the system as part of the installation process. The user profile thus created is utilized to perform an automatic sign-on and to initiate the installation of licensed software applications, as illustrated in block 108. Preferably, the installation user profile contains an option which specifies if the data processing system is to be IPLed or signed-off upon the completion of the installation, thus guaranteeing that this automatic installation user profile will not be left signed-on to the system upon the completion of an installation.

Continuing, if a licensed software application is installed within the system and it is the appropriate version thereof, as determined in blocks 102 and 104, then the process passes directly from block 104 to block 118.

Block 118 depicts a determination of whether or not the installation profile utilized for this installation is to be stored for future use. If the installation profile is to be stored for future use, block 120 illustrates the storing of the installation profile within the system and the process then terminates, as illustrated in block 122.

In the event the installation profile is not to be stored the process simply passes from block 118 to block 122 and terminates. The storing of an installation profile in the manner depicted within block 120 permits subsequent installations of complex multilevel software applications to be automatically installed without the necessity of user intervention, by permitting such multilevel software applications to determine if an installation profile exists within the system upon an attempted installation of that application. In this manner the installation of complex multilevel software applications may be simply and efficiently accomplished.

Upon reference to the foregoing those skilled in the art will appreciate that the installation profile created in accordance with the method of the present invention may be utilized to automatically install a complex multilevel software application into a new data processing system by proceeding through the installation from microcode, operating system and high level applications utilizing a plurality of preset installation options, without requiring the intervention of a user during the installation process.

Further, in the event an installation of a complex multilevel software application has been partially accomplished, or an upgrade to selected portions of that application is to be attempted, the installation profile may be utilized to automatically determine the level of installation which already exists within the data processing system and thereafter automatically accomplish the installation of those portions of the complex multilevel software application contained within the installation media in response to the insertion of the storage media, without the necessity of user intervention.

While the invention has been particularly shown and described with reference to a preferred embodiment, it will be understood by those skilled in the art that various changes in form and detail may be made therein without departing from the spirit and scope of the invention.

What is claimed is:

1. A method for the efficient installation of a complex multilevel software application within a data processing system having selected software applications currently installed therein, said complex multilevel software application including microcode, an operating system and at least one high level application, said method comprising the steps of:

creating within a data processing system an automatic installation profile containing a plurality of preselected installation options for a selected data processing system;

storing said automatic installation profile on a portable storage media with said complex multilevel software application;

in response to an initiation of installation by a user, automatically determining a level of microcode within said selected data processing system;

thereafter utilizing said automatic installation profile to automatically install said microcode within said selected data processing system in response to an insertion of said portable storage media within said selected data processing system by said user to the extent said microcode is not currently installed within said selected data processing system, without the necessity of user intervention during said installation;

automatically determining a level of operating system present within said selected data processing system and thereafter utilizing said automatic installation profile to automatically install said operating system within said selected data processing system to the extent said operating system is not currently installed within said data processing system, without the necessity of user intervention during said installation; and automatically determining a level of high level application present within said selected data processing system and thereafter utilizing said automated installation profile to automatically install said high level application within said selected data processing system to the extent said high level application is not currently installed within said data processing system, without the necessity of user intervention during said installation.

2. The method for efficient installation of a complex multilevel software application within a data processing system having selected software applications currently installed thereon according to claim 1, further including the step of substituting a currently installed installation option for a selected one of said preselected installation options in response to a determination that software associated with said currently installed installation option is currently installed within said selected data processing system.

3. The method for efficient installation of a complex multilevel software application within a data processing system having selected software applications currently installed thereon according to claim 1, further including the step of automatically creating an installation user profile during said automatic installation.

4. The method for efficient installation of a complex multilevel software application within a data processing system having selected software applications currently installed thereon according to claim 3, further including the step of automatically signing-on in said selected data processing system utilizing said installation user profile during said automatic installation wherein said installation user profile may be utilized to install said complex multilevel software application.

5. The method for efficient installation of a complex multilevel software application within a data processing system having selected software applications currently installed thereon according to claim 1, further including the step of storing said automatic installation profile within said selected data processing system after said automatic installation.

6. The method for efficient installation of a complex multilevel software application within a data processing system having selected software applications currently installed thereon according to claim 5, further including the step of automatically installing a second complex software application utilizing said stored automatic installation profile.

7. A method for the efficient installation of a complex multilevel software application within a data processing system, said complex multilevel software application including microcode, an operating system and at least one high level application, said method comprising the steps of:

presenting a plurality of option panels to a user utilizing a data processing system, each option panel requiring a user input to said data processing system specifying a system option for a selected data processing system;

creating within said data processing system an automatic installation profile for said selected data processing system utilizing said specified system options;

storing said automatic installation profile on a portable storage media with a complex multilevel software application;

in response to an initiation of installation by a user, automatically determining a level of microcode within said selected data processing system;

thereafter utilizing said automatic installation profile to automatically install said microcode within said selected data processing system in response to an insertion of said portable storage media within said selected data processing system by said user to the extent said microcode is not currently installed within said selected data processing system, without the necessity of user intervention during said installation;

automatically determining a level of operating system present within said selected data processing system and thereafter utilizing said automatic installation profile to automatically install said operating system within said selected data processing system to the extent said operating system is not currently installed within said data processing system, without the necessity of user intervention during said installation; and automatically determining a level of high level application present within said selected data processing system and thereafter utilizing said automated installation profile to automatically install said high level application within said selected data processing system to the extent said high level application is not currently installed within said data processing system, without the necessity of user intervention during said installation.

8. The method for efficient installation of a complex multilevel software application within a data processing system according to claim 7, wherein at least one of said user inputs specifying a system option for a selected data processing system comprises a user input describing an operating system for utilization with said selected data processing system.

9. The method for efficient installation of a complex multilevel software application within a data processing system according to claim 7, wherein at least one of said user inputs specifying a system option for a selected data processing system comprises a user input describing a hardware configuration of said selected data processing system.

10. The method for efficient installation of a complex multilevel software application within a data processing system according to claim 7, further including the step of automatically creating an installation user profile during said automatic installation.

11. The method for efficient installation of a complex multilevel software application within a data processing system according to claim 10, further including the step of automatically signing on in said selected data processing system utilizing said installation user profile during said automatic installation wherein said installation user profile may be utilized to install said complex multilevel software application.

12. The method for efficient installation of a complex multilevel software application within a data processing system according to claim 7, further including the step of storing said automatic installation profile within said selected data processing system after said automatic installation.

13. The method for efficient installation of a complex multilevel software application within a data processing system according to claim 12, further including the step of automatically installing a second complex software application utilizing said stored automatic installation profile.

* * * * *